Dec. 22, 1936.   E. W. CHAFEE ET AL   2,065,303
APPARATUS FOR THE CONTROL OF GUNFIRE
Filed Jan. 28, 1933   6 Sheets-Sheet 1

INVENTORS
EARL W. CHAFEE,
HUGH MURTAGH and
SHIERFIELD G. MYERS.
BY Herbert H. Thompson
ATTORNEY.

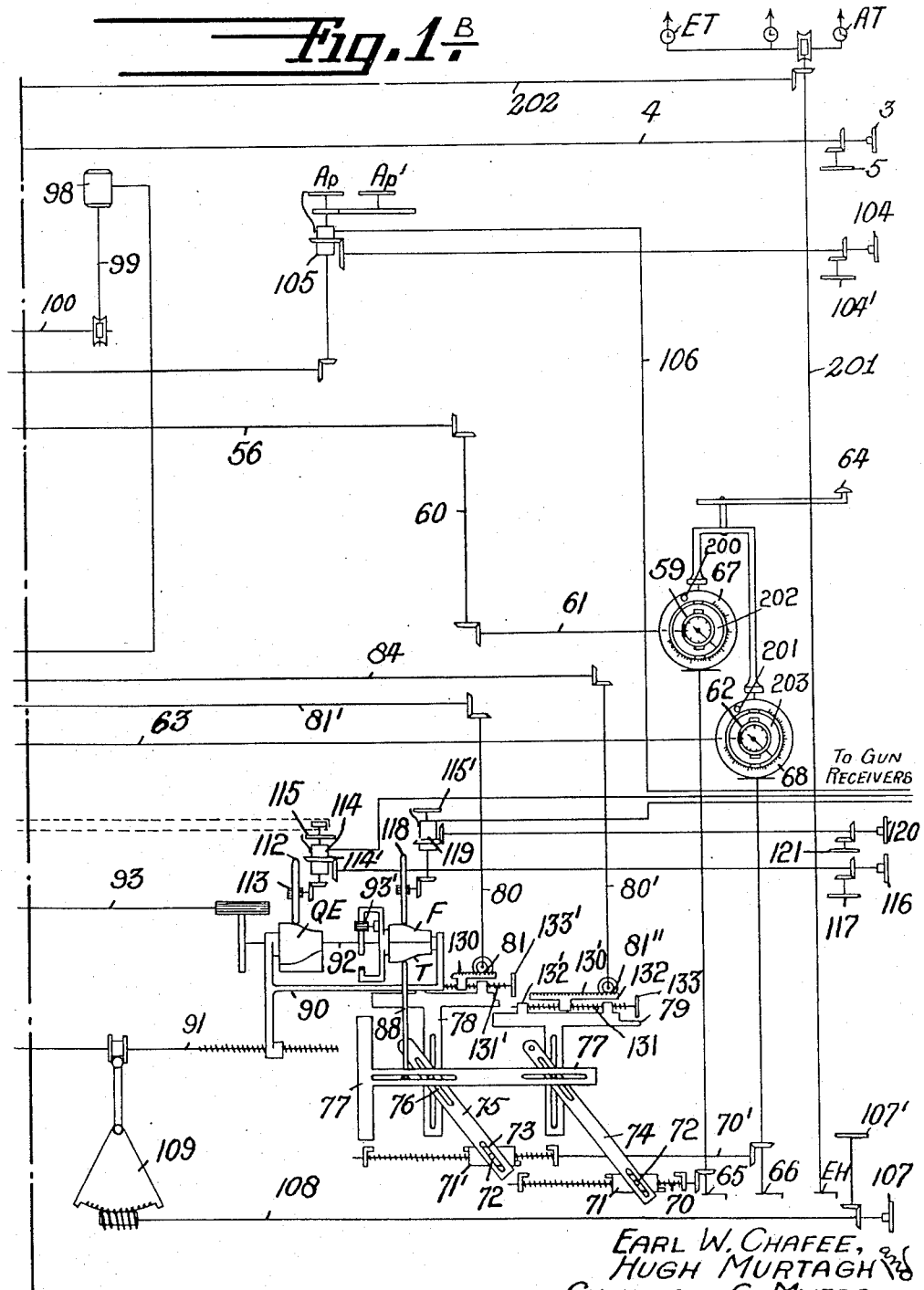

Dec. 22, 1936.   E. W. CHAFEE ET AL   2,065,303
APPARATUS FOR THE CONTROL OF GUNFIRE
Filed Jan. 28, 1933   6 Sheets-Sheet 3

INVENTORS:
EARL W. CHAFEE,
HUGH MURTAGH and
SHIERFIELD. G. MYERS.
BY
Herbert H. Thompson
their ATTORNEY.

Dec. 22, 1936.  E. W. CHAFEE ET AL  2,065,303
APPARATUS FOR THE CONTROL OF GUNFIRE
Filed Jan. 28, 1933   6 Sheets-Sheet 4
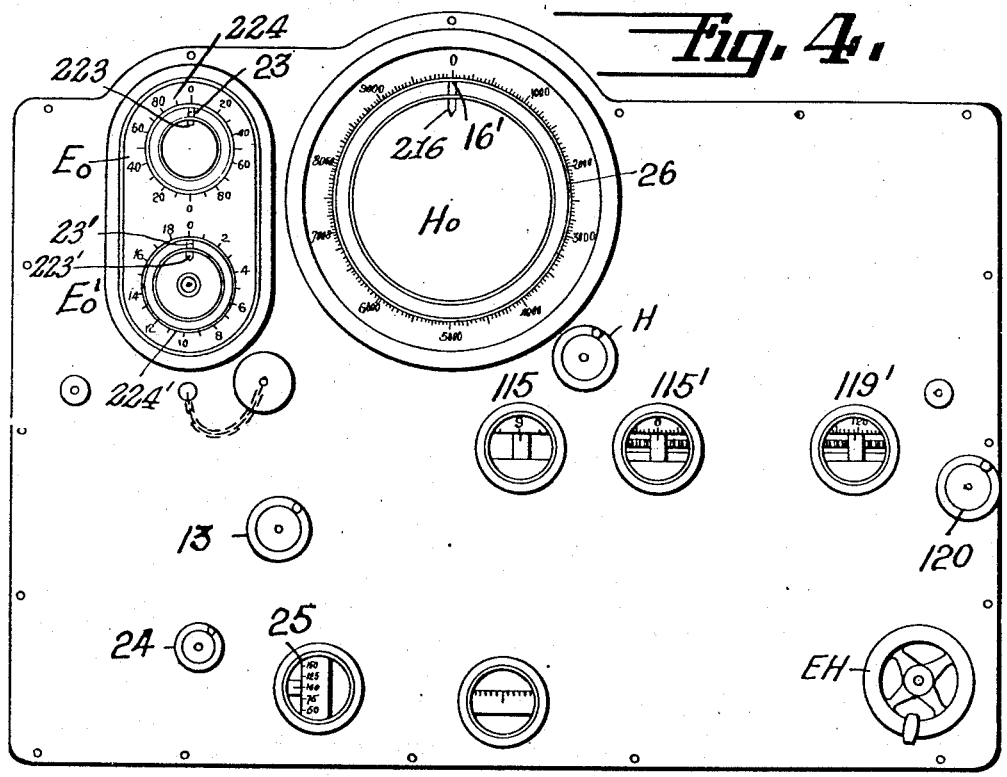
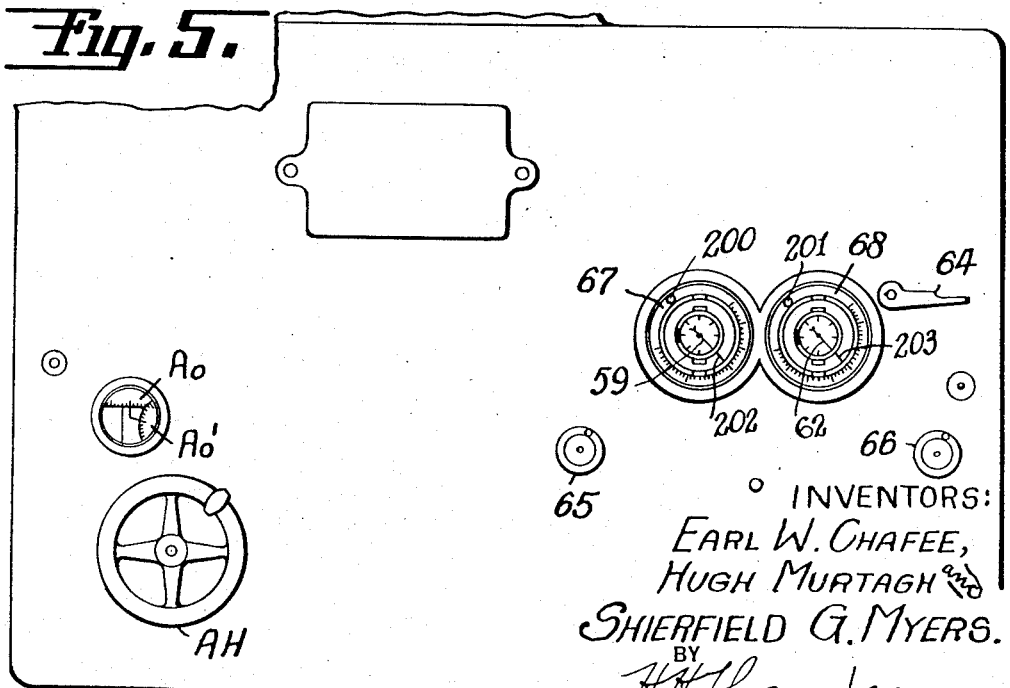
INVENTORS:
EARL W. CHAFEE,
HUGH MURTAGH and
SHIERFIELD G. MYERS.
BY
H. W. Thompson
their ATTORNEY.

Dec. 22, 1936.  E. W. CHAFEE ET AL  2,065,303
APPARATUS FOR THE CONTROL OF GUNFIRE
Filed Jan. 28, 1933  6 Sheets-Sheet 5
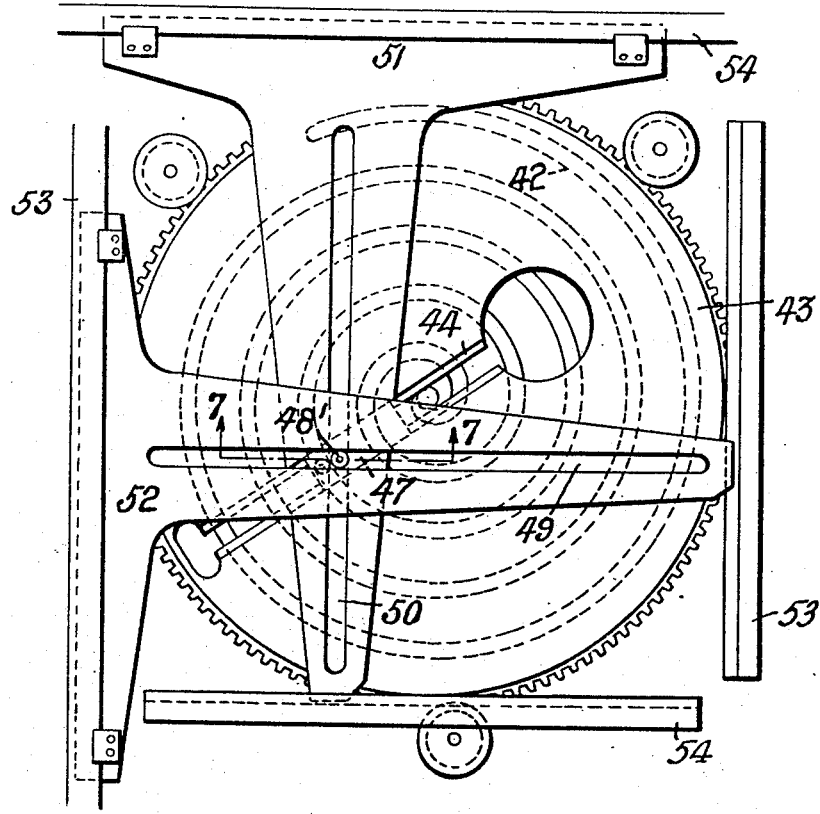
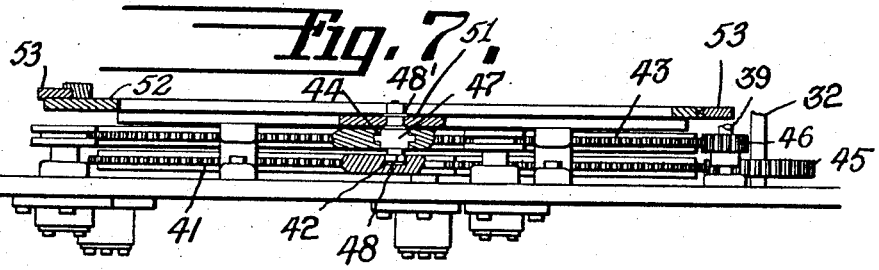
INVENTORS:
EARL W. CHAFEE,
HUGH MURTAGH and
SHIERFIELD G. MYERS.
BY
Herbert H. Thompson
their ATTORNEY.

Dec. 22, 1936. E. W. CHAFEE ET AL 2,065,303
APPARATUS FOR THE CONTROL OF GUNFIRE
Filed Jan. 28, 1933 6 Sheets-Sheet 6

INVENTORS:
EARL W. CHAFEE,
HUGH MURTAGH and
SHIERFIELD G. MYERS.
BY Herbert H. Thompson
their ATTORNEY.

Patented Dec. 22, 1936

2,065,303

UNITED STATES PATENT OFFICE 2,065,303

APPARATUS FOR THE CONTROL OF GUNFIRE

Earl W. Chafee and Hugh Murtagh, Brooklyn, and Shierfield G. Myers, Freeport, N. Y., assignors to Sperry Gyroscope Company, Inc., Brooklyn, N. Y., a corporation of New York Application January 28, 1933, Serial No. 654,090

27 Claims. (Cl. 235—61.5)

This invention relates to a means for directing gunfire against a moving target and more particularly to means for predicting the position of either an aerial or terrestrial moving target, such as a rapidly moving airplane or ship; at the time the shell reaches the target. Our director is designed to determine all the elements necessary for the solution of anti-aircraft firing problems except altitude, which is determined by an auxiliary height finding system, or in case of a land target our director determines all elements except range, which is determined from a range finder. The computation of anti-aircraft firing data may be divided into three steps:

(a) The determination of the present target position both in altitude and azimuth.

(b) The determination of the target's course and speed from which the future position of the target may be determined at the time the shell reaches the same.

(c) The determination of the firing data for laying the gun and setting the fuse.

In our machine all problems are solved simultaneously and continuously so that the dead time is reduced to zero and the data delivered to the gun receivers is correct for a projectile fired at any instant. In the solution of the present position of the target, we prefer not to employ polar coordinates as many prior systems have employed but to first resolve the course of the aircraft into the plane of the ground and then to resolve such ground course into rectilinear or "$x$" and "$y$" coordinates with reference to a fixed datum line, such as a north-south line.

Referring to the drawings in which the invention is illustrated in more or less diagrammatic form, Figs. 1$^A$ and 1$^B$ are the two halves of a diagram showing the principal component parts of our invention.

Fig. 4 is a side elevation thereof.

Fig. 5 is a side elevation from the opposite side.

Fig. 6 is a plan view of one of the computing units of the machine of which there are two.

Fig. 7 is a side elevation of the same, partly in section, the section being taken on line 7—7 in Fig. 6, looking in the direction of the arrow.

As above stated, applicants prefer to employ as the basis for their computations the linear component velocities of the horizontal projection of the aircraft's course as distinguished from the angular rate method heretofore used by others. Referring first to Fig. 2, a point in space $P_1$ (the present position of the aircraft) may be located by its altitude $BP_1$, its angle of elevation $E_0$ and its azimuth relation to some given direction, say angle $A_0$, with respect to the E—W line or other directional line. In this figure the aircraft is represented as flying along a course 1, 2, 3, $P_1$ at the fixed altitude $BP_1$, and it is assumed that the telescopes on the director have been tracking the target along this line and that the target has maintained the same altitude. The present angle of elevation $E_0$ is measured by the elevation tracker turning the handwheel EH (Fig. 1$^B$), which turns the elevation telescope ET, while the present azimuth angle $A_0$ is measured by a second tracker turning the handwheel AH (Fig. 1$^A$), which turns the entire director in azimuth around the fixed gear 1 and with it the telescope AT (Fig. 1$^B$), the two telescopes being tied together so that each is kept on the target. The ground track of the plane will, therefore, be 1'B, and the horizontal range OB (or $R_0$) may be computed from the right triangle $OBP_1$, i. e., $R_0 = BP_1 \cot E_0$, $BP_1$ being the known height ($H_0$) obtained from any standard height finder.

The predicted ground course will lie along an extension of the line 1'B and the predicted actual course along the line 1$P_1$ so that the future position may be located on said lines at B' and $P_2$, respectively, as follows. According to our invention we resolve the line 1'B into two components such as the north-south and east-west directions, determine the rate of movement in each of these resolved directions and multiply this rate by the time of flight of the shell to locate the coordinates of the predicted point B'. The first of these coordinates is represented by the movement of the line S—S drawn parallel to N—S to the position S'S', a distance equal to the easterly component of the ground distance, while the other component is represented by the movement of the line $S_1S_1$ through B to $S_1'S_1'$ a distance equal to the northerly component of the ground distance. The intersection of S'S' and $S_1'S_1'$, therefore, locates the point B' and therefore, the point $P_2$ which lies directly above the same at an elevation $H_0$. Having located the rectilinear coordinates of these points, they may again be converted into the polar coordinates of future horizontal range OB' ($R_P$), future angle of sight elevation ($E_P$) and future azimuth angle ($A_P$), and finally the corrected gun elevation $E_G$.

Figure 1A:
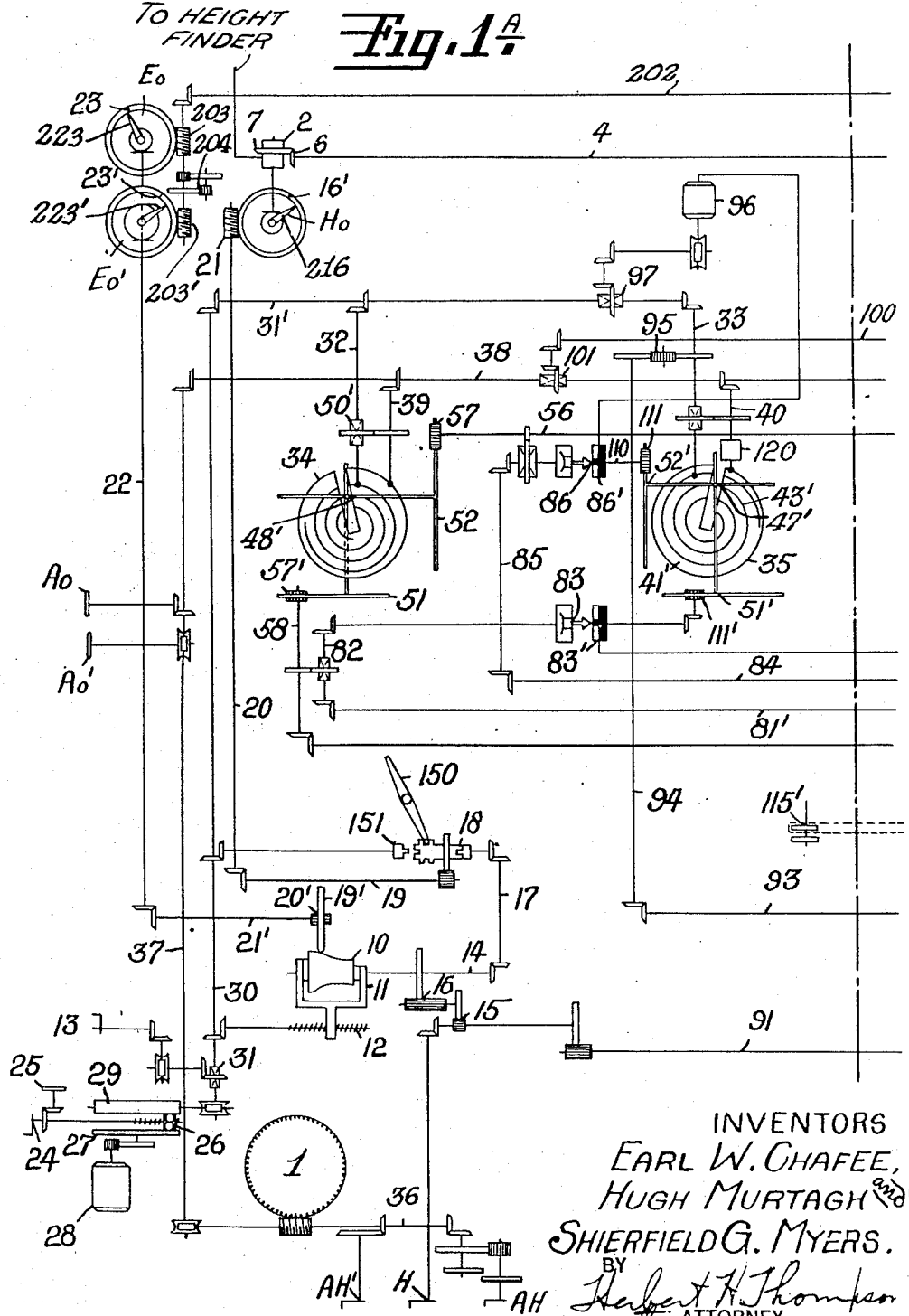
Figure 2:
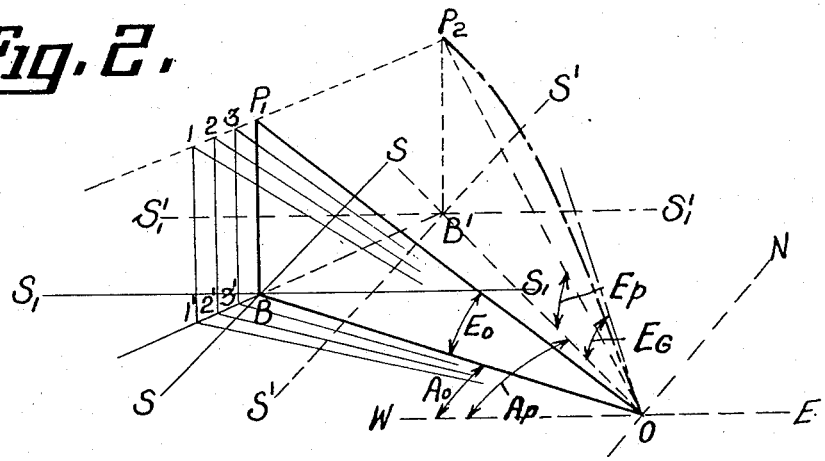
Fig. 2 is a three dimensional diagram illustrating our method of solving the problem of anti-aircraft fire control.
Figure 3:
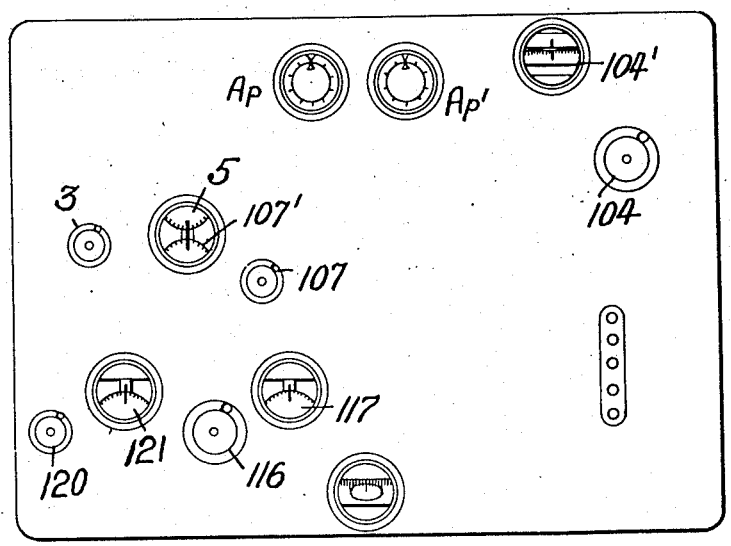
Fig. 3 is a rear elevation of our director showing the dials and handles thereon.

Turning now to the diagrams of Figs. 1A and 1B and assuming the present azimuth angle $A_0$ to have been set in the machine from either the high speed azimuth tracking handle AH' or the low speed handle AH and the elevation angle $<E_0$ to have been set into the machine by the handle EH, the telescopes are then on the target and the two operators keep them there by operating the aforesaid handwheels. At the same time altitude is being set into the machine automatically from a repeater motor 2 operated from a transmitter on a height finder (not shown) to set the altitude into the indicator $H_0$. If desired, a correction for present altitude may be introduced by turning the knob 3 on shaft 4. The correction is shown on dial 5 and the shaft 4 is shown as operating a bevel gear 6 which turns a large bevel gear 7 secured to the rotatably mounted field of the repeater motor 2 whereby a differential action is secured.

The elevation angle appears on the coarse and fine indicators $E_0$ and $E_0'$ and the azimuth angle appears on the coarse and fine indicators $A_0$ and $A_0'$. The present horizontal range $R_0$ is computed by the machine from the setting of the cam 10 which solves the equation $$R_0 = \frac{H_0}{\tan E_0}$$

above referred to.

If, however, the cam were laid out as a tangent cam it would reach unwieldly proportions as the angle approaches 90 degrees. In fact such a cam could not be built to give any accurate results within 15° of the zenith. Similarly, if the cotangent functions were used, the same difficulty would be experienced as zero elevation is approached. Therefore, we prefer to lay the cam out as between altitude and horizontal range to give the lift directly in angular degrees which is, of course, a finite quantity around a complete circumference. Such a cam will have a spiral thereon of constant ratios starting when both altitude and range are zero and passing through the point when the range and altitude are equal when the angle is 45°. It is obvious that for each ratio between altitude and range there is a definite angle $E_0$. If the cam is laid out so that its lift at each point represents the angle defined by the ratio at that point, altitude and range, the lift of the pin thereon will give directly the angular height or $<E_0$, and when the $E_0$ pointer 223 and index 23 are matched and altitude set in, the output will be range. The particular advantage of this cam, therefore, is that it permits of making a mechanism which can be used for any amount of rotation and does not have to cut out, say at 80° angular height, as many directors now do.

This cam is one of a plurality of so-called three dimensional cams which we prefer to employ, that is, it is not only rotated but movable axially with respect to the cam follower. We are aware that three dimensional cams have been proposed heretofore, but in the prior art a plurality of cams were mounted on a common shaft and axial displacement was obtained by moving the cam pin along the cam. Such a construction gives rise to complications and errors in the result, since it is the up and down movement of the pin that provides the answer sought. In our construction, on the other hand, we keep the cam pin in the same position, transversely, and rotate the cam in accordance with one function and shift it axially in accordance with another function by which more accurate results are obtained. The said cam is positioned laterally as by having the support 11 thereof threaded on a threaded shaft 12 which is turned from the present range setting handle 13. The cam is also rotated on its axis from the shaft 14 which is, in effect, set from the height as shown on the indicator $H_0$. In order to supply power for turning the gearing, a handle H is provided which turns gearing 15 and 16 and shaft 14 and also turns the outer index 16' for the pointer 216 of indicator $H_0$ through shaft 17, clutch 18, shafts 19 and 20, and wormwheel 21. Obviously a power multiplying device could be employed, if desired. On said cam rests a lift pin 19', the axial lift of which rotates through a rack and pinion 20', a shaft 21' which in turn, through shaft 22, rotates pointers 223 and 223' on the elevation angle indicators $E_0$ and $E_0'$. The cam is so laid out that with the correct height $H_0$ and elevation angle $E_0$ set into the machine, the rotation of the present range handle 13 to match the pointers and indices of indicators $E_0 E_0'$ will be a measure of the horizontal range $R_0$. The elevation angle $E_0$ is set on the indices 23 and 23' of indicators $E_0$ and $E_0'$ from the handwheel EH, which maintains the sight on the target (in elevation) through shafts 201 and 202, worms 203 and 203' and step-up gearing 204. As shown in Fig. 4, each pointer and index 223 and 23 reads on the same fixed dial or scale 224 and, similarly, pointer and index 223' and 23' read on the dial 224'. It is of course immaterial what form the pointers and indices take, both being shown in Fig. 4 merely as reference marks on rotatable dials.

It should be remembered, however, that with the movement of the aircraft the various factors are continuously changing. As the elevation angle changes, the operator of handle 13 preferably shifts to the range rate handle 24. This handwheel turns a dial 25 and positions the shiftable member of a change speed device. As shown it positions a ball or balls 26 operating between a disc 27 turned from a constant speed motor 28 and a cylinder 29. Said cylinder operates the same shaft 30 as the handwheel 13 through a differential 31, and thus when handle 24 is set so that follow-the-pointers of indicators $E_0$ and $E_0'$ stay matched the correct rate of change of range has been set up. Such a system of continuously approximating the change in values may be termed the flow method or system by which the correct future position is obtained very quickly although every change in each variable set up alters the setting for the other variables.

Shaft 30 not only positions the cam 10 as explained but also operates the cross shaft 31' and the shafts 32 and 33 driving present range into the present position resolving mechanism 34 and the future position resolving mechanism 35. Similarly the azimuth angles $A_0$ are set in from the handwheel AH through shafts 36, 37 and 38, the latter being connected to the present mechanism 34 through shaft 39 and to the future mechanism through shaft 40. Said mechanisms are preferably superimposed and may be of identical construction (see also Figs. 6 and 7). Each mechanism may comprise a large gear 41 having a spiral groove 42 in the upper face thereof. Said gear, in the case of the present mechanism, is turned from the range shafts 30, 32 through a pinion 45. Superimposed thereon is a second concentrically mounted gear or plate 43 having a radial slot 44 therein which is rotated by a pinion 46 on the azimuth shaft 39. In said slot is slidably mounted a block 47 having pins and rollers 48—48' extending both downwardly and upwardly therefrom, the lower roller engaging the spiral groove 42 and the upper pin passing through slots 49 and 50 in super-imposed plates 51 and 52. It will readily be seen that the angular position of block 47 about the center of rotation 0 of said gear is the azimuth angle $A_0$ and the distance along the radius is the range $R_0$. Said plates or slides are constrained by slideways 53 and 54 to move at right angles to one another and it will readily be seen that the rectilinear movements thereof represent the component movements of the ground course of the target when the range gear or disc 41 is set in accordance with the present range and the azimuth gear or disc 43 is set in accordance with $A_0$. The differential 50' is for the purpose of preventing the range from being changed when only $A_0$ is being changed by causing the two gears to move together under such conditions.

As above stated, the future resolving mechanism 35 may be quite similar in construction but in this case the range gear 41' is rotated by a shaft 33 which is driven not only from the present range shaft 31' but also from a "range difference" motor 96 or change of range motor through a differential 97. Similarly the azimuth gear 43' is driven from shaft 40 which is rotated not only by the shaft 38 but also from the "azimuth difference" motor 98 through shafts 99 and 100 and differential 101. The vertically movable slide 52' in this instance is shown as turning a shaft 110 through rack and pinion 111. On said shaft is mounted one portion 86' of follow-up contacts 86—86'. Plate or slide 51', on the other hand, is shown as turning through similar rack and pinion 111' one portion 83' of follow-up contacts 83—83', the complementary contacts in each case being driven by one or the other of the range or azimuth difference motors as hereinafter explained.

Returning to the present resolving mechanism, the rates of movement of the two slides 51 and 52 are, of course, proportional to the rate of movement of the target in the two component directions. To determine such rates, we actuate from the up and down movements of slide 52, a shaft 56 through a rack and pinion connection 57; and through a similar connection 57' we operate the shaft 58 from the right and left movement of slide 51. Shaft 56 is shown as connected to a rate indicating instrument 59 through shafts 60 and 61, while the shaft 58 is connected to a similar rate indicating instrument 62 through shaft 63. Said instruments may be in the form of tachometers which operate for a predetermined interval, say 3 seconds, every time the rate lever 64 is depressed. Such a simple form of rate device furnishes accurate and true component rate indications according to our system of using rectilinear coordinates, but obviously could not be successfully used in the polar system, because in that system the rates do not remain constant with a constant velocity of the target but vary with a function of the sight angle and range. The operator then turns the handwheels 65 and 66 to rotate the outer dials 67 and 68 to whatever the reading the tachometers show so that the handle 65, for instance, is set in accordance with the north-south rate of the target and the handle 66 in accordance with the east-west rate.

Our accurate component rate dials also are employed to introduce wind corrections in a very simple and direct manner. It can be shown that the effect of wind is to cause a movement of the shell in the direction of the wind an amount directly proportional to the time the shell is in the air and to the wind's velocity. Therefore, if the factors, wind-speed and direction are known, these may be readily resolved into north-south and east-west component velocities and set in as corrections to the target component rates thus moving the predicted position of the target by the amount the wind would have displaced the shell from the predicted point in space. The above is accomplished by the setting handwheels or knobs 200 and 201 respectively positioning the index rings 202 and 203 to the value of wind correction desired on the dials 67 and 68. The setting of handle 65 turns a threaded shaft 70 on which is threaded a block 71, while the turning of the shaft 66 turns a similar threaded shaft 70' on which block 71' is threaded. Each block carries a pin 72 slidably mounted in slot 73 of levers 74 and 75, respectively. Each lever has a slide therein mounted in a slot 76 and having pins thereon which pass through slots in T-shaped bars 78 and 79 as the case may be and the common T-shaped bar 77. The T-shaped bar 78 is shown as turning by its lateral movements a shaft 80 through rack and pinion 81; shaft 80 driving a shaft 81' which leads through shaft 82 to follow-up contacts 83 on the future position mechanism 35. Similarly the lateral movement of slide 79 turns through a rack and pinion connection 81'', shafts 80', 84 and 85 leading to a follow-up mechanism 86 about the other axis of the future computing mechanism.

The up and down position of the T-shaped bar 77, on the other hand, is controlled in accordance with the time of flight of the shell. As shown, said bar is moved by a pin 88 resting on a time of flight cam T. This mechanism computes rates multiplied by time of flight, which are also the coordinate distances of the target travel from its present position. The time of flight of the shell is of course a function of the total range or slant range, which, in turn, is the hypotenuse of a triangle of which the horizontal range is the base and the altitude the vertical leg. The time of flight cam, which is likewise a three-dimensional cam, hence may be moved in one direction, say laterally, in accordance with the altitude and rotated in accordance with the horizontal range, the cam being so laid out that the lift of the pin represents the time of flight of the shell. More specifically, the cam is positioned laterally by having the supporting bracket 90 thereof threaded on a shaft 91 which is turned from or set in accordance with the altitude from handle H. The rotation of said cam T is controlled from shaft 92 on which is preferably also mounted a fourth cam, which is the quadrant elevation cam $Q_E$, the cam T being turned at one half the speed of the cam $Q_E$ through gearing 93', because in the embodiment shown we have shown the cam T as comprising only one half of a complete truncated conoid, the other half being employed as a separate cam F for fuse setting calculations. The shaft 92 is rotated from shafts 93 and 94, the latter being rotated through gearing 95 from the future range shaft 33. The coordinate distances obtained from the rate by time multipliers are added to the present position coordinates through shafts 81' and 84 by rotating the contacts 83 and 86 distances proportional to the above mentioned coordinate distances.

Each of the two plates 52' and 51' of the future mechanism positions complementary contacts 86' and 83', respectively, as hereinbefore explained, working in cooperation with the above mentioned contacts 86 and 83. Said contacts operate the range difference and azimuth difference motors 96 and 98 preferably through the connections hereinafter described in connection with Fig. 8. Therefore, the future mechanism receives the predicted coordinates of the target's position from which the future range $R_P$ and future azimuth angle $A_P$ may be determined by the angular position of the two gears 41' and 43'. The former is represented by the rotation of the shaft 33 and the latter by the rotation of the shaft 40, which is indicated as future azimuth by the coarse and fine dials $A_P$ and $A_{P'}$. Into said dials lateral corrections may be introduced from the handwheel 104 which rotates the field of the $A_P$ transmitter 105 transmitting the future azimuth angle to the gun through the cable 106.

Figure 9:
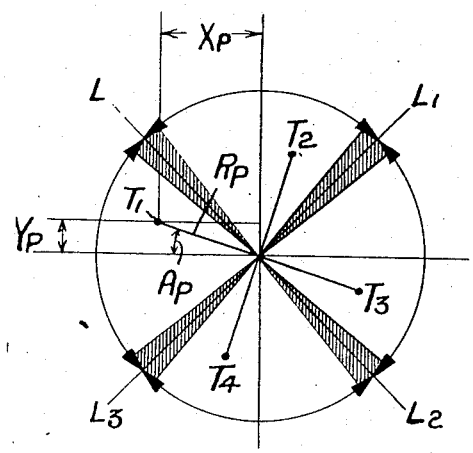
Fig. 9 is a diagram showing the theory of operation of the motors.

A consideration of the problem being solved by the future resolving mechanism will show that it converts the two rectangular coordinates of the future position of the target into polar coordinates, range $R_P$ and azimuth angle $A_P$, or, in other words, that the mechanism solves for two unknowns simultaneously and that the entire system continuously integrates for these unknowns, the machine operating by what may be termed the flow method by which the correct future position is obtained very quickly although every change in each variable alters the setting for the other variables. Therefore, both motors 96 and 98 operate simultaneously and each influences the position of the other. A consideration of the diagram shown in Fig. 9 will show that for best results one set of follow-up contacts should not control the same motor under all circumstances but that preferably the contacts and motors be interchanged according to the position of the gears 41 and 43. Thus, if the target is located at the point $T_1$ in Fig. 9, it will readily be seen that a change in the angle $A_P$ is more effective in obtaining a change in the coordinate $Y_P$ than in changing range $R_P$, while a change in the range $R_P$ is more effective in obtaining a change in the coordinate $X_P$ than changing the angle $A_P$. Similarly, if the target lies at the point $T_2$, it may readily be seen that a change in the angle is more effective in obtaining a change of the $x$ coordinate and a change in range is more effective in obtaining a change in the $y$ coordinate. In other words, somewhere between points $T_1$ and $T_2$ the azimuth difference motor 98 should be transferred from the contact 86 to the contact 83 and vice versa with the range difference motor 96.

In general it may be stated that for positions lying between the 45° lines $L_3$ and L, the contact 86 should control the azimuth difference motor while the contact 83 controls the range difference motor, while in the quadrant between the 45° lines L and $L_1$ the reverse is true. Between quadrants $L_1$ and $L_2$ the same conditions prevail as between L and $L_3$ except that the signs are reversed, or, in other words, the motors have to be run in the opposite directions, while between $L_2$ and $L_3$ the conditions are similar to the conditions between L and $L_1$ except that the signs are reversed.

Figure 8:
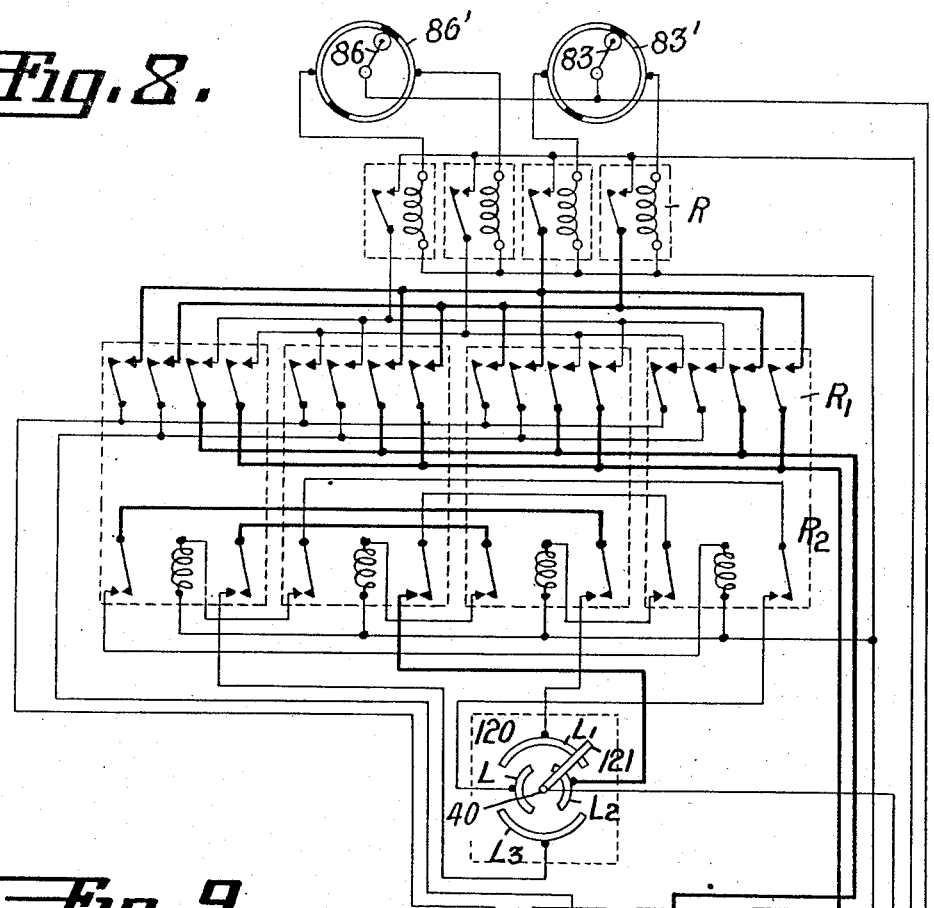
Fig. 8 is a wiring diagram showing how the range difference and azimuth difference motors are operated from the follow-up contacts on the computing devices of Fig. 6.

In Fig. 8 is shown an automatic means for effecting the above indicated transfer. The contacts 86—86' and 83—83' are shown as controlling the motors 96 and 98 through a series of relays R, $R_1$ and $R_2$. There is also provided a selector switch 120. Said switch is provided with quadrant contacts L, $L_1$, $L_2$ and $L_3$ designed to transfer control near the 45° lines referred to in connection with Fig. 9, the switch arm 121 being mounted on shafts 40 of Fig. 1A. Each sector L, $L_1$, $L_2$ and $L_3$ is preferably slightly greater than 90° so that there is an overlapping of a few degrees adjoining each pair of sectors as indicated by the shaded portions in Fig. 9. By means of the relays $R_1$—$R_2$, the operation of which is well known in the electric motor control art and need not be described in detail, the control of the motors may be transferred and their direction reversed in accordance with the position of the switch arm 121 but within the overlapping regions the motor will remain in control of the contact sector first assuming control until the switch arm leaves the same and rests only on the other sector due to the interlocking circuit of the relays. This is for the purpose of preventing rapid transfer of control of the motors in case the arm 121 is positioned (oscillating) near one of the 45° lines L.

Since the gunners must know the quadrant elevation at which the guns must be pointed, which is the sum of the future elevation angle and the "super" elevation, and since both future elevation and super elevation are functions of future horizontal range $R_P$ and altitude H, we prefer to compute the sum of the two on the same cam QE to give quadrant elevation. Future range $R_P$ represented by the rotation of the shaft 94 may, therefore, be used to rotationally position the cam shaft 92 and the cams QE, F and T. As above explained, said cams are laterally positioned by altitude from shaft 91 into which may also be introduced future altitude corrections from knob 107 which turns shaft 108 to rotate a worm gear sector 109 to axially translate the shaft 91 and with it the carriage 90.

With the quadrant elevation cam properly laid out, therefore, the lift of the pin 112 thereon will represent the quadrant elevation, i. e., future elevation plus superelevation, this lift being transmitted through rack and pinion 113 to rotate the quadrant elevation transmitter 114 to send out quadrant elevation to the guns. If desired, coarse and fine quadrant elevation dials 115 and 115' may be provided at the instrument. Also, provision may be made for introducing quadrant elevation corrections through the handle 116 and dial 117. Turning the handle 116 turns the rotatably mounted field 114' of the transmitter so as to correct the transmitted quadrant elevation. Similarly, if the fuse cam F is properly laid out, the lift of the pin 118 will represent the fuse setter's data and this may be transmitted through the transmitter 119 to the gun. Similarly, fuse corrections may be introduced through the handle 120 and dial 121, the former turning the rotatably mounted field of the transmitter 119, as above described.

So far the fire control director has been described as operating when located at the gun position. Usually, however, the fire control director is at some distance from and may be at a different elevation from the gear. We prefer, therefore, to provide a means for setting into the director such corrections as may be necessary to take care of the differences in position of the director and gun which are herein referred to as the azimuth parallax correction and the vertical parallax correction. A convenient method of effecting the former is to set in the distance from the battery to the director (resolved rectilinearly) as a correction in the position of the above described slides 51', 52' of the future position computing mechanism so that the correction appears in the predicted position of the target although not affecting the present position mechanism. For this purpose the rack bars 130 and 130' which position the pinions 81, 81' are shown as threaded on threaded shafts 131, 131', each journalled in lugs 132' on the T-shaped bars 78 and 79. By rotating the thumb piece 133 on the shaft 131, the slide 130' may be adjusted in accordance with the $y$ component, say, of the distance of the position of the gun from the director, while by adjusting the thumb piece 133' the slide 130 may be adjusted in accordance with the $x$ component of the same.

The vertical parallax component may be readily introduced by means of the future altitude correction knob 107 by which the difference in elevation between the gun and director may be set without affecting the present altitude settings.

Although our invention is adapted for firing at aircraft moving at constant altitude, it may also be used against a diving target, in which case the aforesaid future altitude dial 107 may be used to set up the changes in altitude. Another method, however, is for the operator of the range cranks 13 and 24 to leave those cranks as they were at the instant the change in altitude was noted and to continue to keep the pointers on the $E_0$ dials matched by means of the present altitude crank H. The director will then solve for the present altitude assuming the rate of change of $R_0$ to remain constant during the dive. The actual present position of the target is set into the director and if proper future altitude correction is applied, the shell's burst will be on the target.

As above mentioned, our invention may also be used against moving targets on the ground or sea. When so used, the clutch handle 150 is used to unclutch the altitude handle H and to couple shafts 30 and 19 through clutch 151, thus connecting the range drive to the outer index 16' of the $H_0$ dial, the inner index of which is rotated by the range repeater motor 2, set from a range finder. Thus, instead of altitude being set into the fire control director, range is received and set into the dial $H_0$ and this dial is matched by turning cranks 13 and 24. If the target is on the same level as the director, indices 23 and 23' will be at zero and inner pointers 223 and 223' of the $E_0$ indicators are set to zero by turning crank H.

It is interesting to note that our fire control director also furnishes a solution in case the target is below or above the elevation of the director. In order to sight on the target in this case the sighting telescope ET is, of course, depressed or elevated through an angle $E_0$ and, therefore, by matching the pointers and indices of both the $H_0$ and $E_0$ indicators through the handle 13 and H respectively, the $E_0$ angle is automatically set in the director, the difference in elevation thereby being determined. Vertical and horizontal parallax when the gun is at a different elevation and/or azimuth position of the fire control director may be taken care of as before explained.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A device for computing predicted positions of a moving aerial target including a sight for following the azimuthal target movements, a movable reference member, means for rotating said member from said sight about a center, means for radially moving said member toward and away from said center a distance proportional to the horizontal range, means for computing the linear rate of movement of said member in predetermined directions, a second movable member rotatable in azimuth and movable from the first member, and additional means actuated from said rate computing means for setting said second member an additional distance proportional to said computed rate of movement and the time of flight of the shell.

2. An anti-aircraft director for computing predicted positions of a moving aircraft from a battery in which the altitude is known, a sight, means for resolving the angular sight movements into azimuth and elevation angles, means for computing horizontal range from the elevation angle and altitude, means for locating a point in azimuth at said range and along the horizontally resolved line of sight, means for determining the rate of movement thereof in component directions, means for multiplying said rates by the time of flight of the shell, means for adding the results to said present position components giving predicted position components, means for combining said components to give predicted horizontal angle and range, and means for finally combining said predicted range and the altitude giving predicted elevation angle.

3. In a fire control director in which the director and battery may be spaced, mechanical means for resolving the target's position as observed from the director into rectilinear components, means for determining the rate of movement of the target along each component, means for combining each rate with time of flight of the shell to locate the predicted position by its components, and means for setting into said last-named means the component distances of the battery from the director.

4. In a fire control director in which the director and battery may be at different elevations, means for resolving the target's position as observed from the director into rectilinear components in a horizontal plane, means for computing the rate of movement along each component, means for setting in present altitude, a future position predicting device in which said rates, altitude and range are introduced, and means for superimposing an altitude correction in said introduced altitude in accordance with the difference in altitude between the director and battery.

5. In a fire control director in which the director and battery may be spaced both in azimuth and elevation, means for resolving the target's position as observed from the director into rectilinear components, means for indicating the rate of movement of the target along each component, means for combining each rate with the time of flight of the shell, means for setting into said last-named means the component distances of the battery from the director, means for setting in the altitude of the target above the director, and means for also introducing an altitude correction into said last named means in accordance with the difference in altitude between the director and battery.

6. In a fire control director, means for resolving the target's position as observed from the director into rectilinear components fixed in azimuth, means for indicating the rate of movement of the target along each component, a future position predicting device, means for correcting said rates in accordance with the component wind velocity and introducing said component corrected rates into said device, whereby wind correction is directly introduced into the predicting mechanism.

7. In a fire control director, means for continuously resolving the target's position into rectilinear components fixed in azimuth, tachometers for indicating the rate of movement of the target in each component direction, a future coordinate position predicting device, means for setting said indicated rates into said device, and means for reconverting said future coordinate position into target bearing angle and gun elevation.

8. In a fire control director, resolving mechanism for converting the rectilinear coordinates of predicted target position into range and bearing angles including a follow-up controller for following the $x$ coordinate movements, a follow-up controller for following the $y$ coordinate movements, a range introducing means and a bearing introducing means, said last two means being separately controlled by said controllers, and selective means for selecting which controller governs which means according to the quadrant the target lies in.

9. In a fire control director, resolving mechanism for converting the rectilinear coordinates of predicted target position into range and bearing angles including a follow-up controller for following the $x$ coordinate movements, a follow-up controller for following the $y$ coordinate movements, a range introducing means and a bearing introducing means, said last two means being separately controlled by said controllers, selective means for selecting which controller governs which means according to the quadrant the target lies in, and means for delaying the change-over from one controller to the other within limited zones adjacent the change-over quadrant lines.

10. In a fire control director, means for continuously setting in the present bearing angle and range, a predicting mechanism for computing the future range and bearings of a moving target comprising a pair of rectilinearly movable slides, each having the secondary or follow-up element of an electrical controller thereon, a primary element for each controller, a range change motor and a bearing angle change motor controlled from said controllers, a two-part resolving unit for moving said slides, means for turning and radially moving the parts of said unit from the present bearing angle and said angle change motor and from the present range and range change motor, and predicting mechanism for predicting the future position of the target, said primary controller elements being positioned by said mechanism, the future range and bearing being indicated from the position of the two parts of said resolving unit.

11. In a fire control director, means for continuously setting in the present bearing angle and range, a predicting mechanism for computing the future range and bearings of a moving target comprising a pair of rectilinearly movable slides, each having the secondary or follow-up element of an electrical controller thereon, a primary element for each controller, a range change motor and a bearing angle change motor controlled from said controllers a two-part resolving unit for moving said slides, means for turning and radially moving the parts of said unit from the present bearing angle and said angle change motor and from the present range and range change motor, coordinate rate of change indicators operated from the present resolved positions of the target, means for obtaining the time of flight in part from said present range and range change motor, and means for combining said coordinate rates and the time of flight to obtain future coordinate positions, said primary controller elements being positioned by said last-named means, the future range and bearing being indicated from the position of the two parts of said resolving unit.

12. In a fire control director, means for computing quadrant elevation including a three dimensional cam and a cam follower, said cam and follower being mounted for relative rotation and axial movement to raise and lower the follower, future range means for imparting one of said movements, and altitude means for imparting the other of said movements, said cam being laid out so that the lift at each point represents quadrant elevation for the indicated range and altitude.

13. In a fire control director, means for setting up range from known altitude and elevation angle comprising a three dimensional cam and follower mounted for both relative rotation and translatory movement, said cam being laid out in altitude units in one direction of movement, in range units in the other and so that the lift of the follower at each point represents the angle of elevation for the altitude and range at that point, and means for moving the cam in one direction for altitude and in the other direction for range until the indicated lift equals the known angle of elevation.

14. In a fire control director, means for setting up range from altitude and elevation angle without employing a tangent function of the latter comprising a cam in which the lift at each point represents the known angle of elevation corresponding to the ratio between the known altitude and unknown range, means for setting the cam in accordance with altitude, means for also setting in the range function into said cam until the said lift equals the known angle of elevation, and means for introducing the resultant range setting into the director.

15. In a fire control director, means for computing quadrant elevation in one operation without separately computing future elevation and super elevation including a cam and cam follower, means for mounting said cam and follower for relative rotation and lateral movement, means for setting in one of said relative movements in accordance with the future range, and means for setting in the other of said relative movements in accordance with altitude said cam being so laid out that the lift at each point is the quadrant elevation for the set in range and altitude.

16. In a fire control director adapted for both aerial and ground targets, an indicator into which altitude is set for aerial targets and range for ground targets, a second indicator into which angular elevation is set, follow-up means for both indicators, an angular height cam, the lift of which actuates the follow-up means on the angular elevation indicator, means for setting said cam at will either from range and altitude for aerial targets or from range and height for ground targets so as to match both of said indicators, and means for transferring the control of the first-named follow-up means from the altitude to range setting means.

17. A device for computing predicted positions of a moving target including a sight for following the target movements, a movable reference member, means for rotating said member about a center from the azimuthal rotation of said sight, means for radially moving said member toward and away from said center a distance proportional to the horizontal range, means for resolving the movement thereof into relative components in fixed directions, means for computing the linear rate of movement of said member along said fixed components, a second member, means for fixing the rectilinear component position thereof from the component position of the first member, and additional means actuated from said rate computing means for adding to both component positions additional distances proportional to said computed component rates of movement and the time of flight of the shell.

18. A device for computing predicted positions of a moving target including a sight for following the target movements, a movable reference member, means for rotating said member about a center from the azimuthal rotation of said sight, means for radially moving said member toward and away from said center a distance proportional to the horizontal range, means for resolving the movement thereof into relative components in fixed directions, means for computing the linear rate of movement of said member along said fixed components, a second member, means for fixing the rectilinear component position thereof from the component position of the first member, additional means actuated from said rate computing means for adding to both component positions additional distances proportional to said computed component rates of movement and the time of flight of the shell, and a power driven follow-up system for converting the rectilinear coordinate position of said second member into the polar coordinates of future range and future bearing.

19. In a fire control director in which the director and battery may be spaced in azimuth, means for resolving the target's position as observed from the director into rectilinear components, means for indicating the rate of movement of the target along each component, means for combining each rate with the time of flight of the shell, and means for setting into said last-named means the component distances of the battery from the director.

20. In a fire control director, resolving mechanism for converting the rectilinear coordinates of predicted target position into range and bearing angles including an $x$ slide and a $y$ slide mounted for movement at right angles to each other, a follow-up controller for following the $x$ coordinate movements, a follow-up controller for following the $y$ coordinate movements, a pin at the intersection of said slides, a rotatable disc having a radial slideway, a block slidable therein and carrying said pin, a bearing motor controlled by one of said controllers for rotating said disc, and a range motor controlled by the other of said controllers for moving said block radially in said slideway.

21. In a fire control director having altitude and angular elevation indicators, follow-up members for each, means for setting each of said follow-up members including altitude setting and range setting means, a cam set from both, and a lift pin thereon, the lift of which actuates the follow-up member of said elevation indicator.

22. In a fire control director having altitude and angular elevation indicators, follow-up indicators for each, means for setting each of said follow-up indicators including height setting and range setting means, a cam set from both, and a lift pin thereon, the lift of which turns the follow-up indicator of said angular elevation indicator in solving for range.

23. In a fire control director, means for continuously resolving the target's present position as observed from the director into two rectilinear components fixed in azimuth, a tachometer for measuring the rate of each component movement, means for introducing a correction for wind into each in accordance with a function of the corresponding component wind velocity, and a future position predicting device actuated from said corrected rates.

24. In a universal fire control director adapted for either aerial or moving ground targets, comprising a pair of follow the pointer indicators, means for setting either height or slant range into one indicator, means for setting angular elevation into the other, a hand setting means for setting the follow-up pointer of the first named indicator, a cam positioned thereby in one dimension, a second hand setting means for setting said cam in another dimension, a pin on said cam, the lift of which actuates the follow-up member of the second indicator, whereby said second setting means generates range, and means for transferring the actuation of the follow-up pointer of the first indicator to said second hand setting means when slant range is set into the first indicator, whereby said first setting means generates height.

25. In a fire control director adapted for both aerial and ground targets, an indicator into which altitude is set for aerial targets and slant range for ground targets, a second indicator into which angular elevation is set, follow-up means for both indicators, an angular height cam, the lift of which actuates the follow-up means on the angular elevation indicator, means for setting said cam at will either from altitude for aerial targets and from a setting to match the angular elevation indicator from which range is obtained, or from range and from a setting to match the angular elevation indicator from which height is obtained for ground targets, and means for transferring the control from said first named follow-up means from the altitude to the range setting means.

26. In a fire control director, means for setting up altitude from slant range and elevation angle without employing a tangent function of the latter, comprising a cam in which the lift at each point represents the known angle of elevation corresponding to the ratio between the known slant range and unknown altitude, means for setting the cam in accordance with slant range, means for setting in the altitude function until the said lift equals the known angle of elevation, and means for introducing the resultant altitude setting into the director.

27. In a fire control director having slant range and angular elevation indicator, follow-up indicators for each, means for setting each of said follow-up indicators, including known range and unknown altitude setting means, a cam set from both, and a lift pin thereon, the lift of which turns the follow-up indicator of said angular elevation indicator in solving for height.

EARL W. CHAFEE.
HUGH MURTAGH.
SHERFIELD G. MYERS.